(12) United States Patent
Sekiya et al.

(10) Patent No.: US 6,484,128 B1
(45) Date of Patent: Nov. 19, 2002

(54) DATA PROCESSING SYSTEM WITH CONFIGURATION MANAGEMENT CAPABILITY BASED ON COMPATIBILITIES AMONG HARDWARE MODULES

(75) Inventors: Yoshimasa Sekiya, Fukuoka (JP); Hirofumi Kobayashi, Fukuoka (JP); Yoshito Taniyama, Fukuoka (JP); Yoshiaki Horinouchi, Fukuoka (JP); Koji Mikami, Fukuoka (JP); Shinichi Tabe, Fukuoka (JP); Masayoshi Kamada, Fukuoka (JP); Mitsuhiro Sato, Fukuoka (JP); Harutaka Tanaka, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/501,717
(22) Filed: Feb. 10, 2000

(30) Foreign Application Priority Data
Jun. 11, 1999 (JP) .............................. 11-165396

(51) Int. Cl.$^7$ .............................. G06F 19/00; G06F 3/00
(52) U.S. Cl. ........................................ 702/185; 210/15
(58) Field of Search ................................ 702/185, 186, 702/187; 710/15, 16, 17, 18, 19

(56) References Cited

U.S. PATENT DOCUMENTS

| | | | | |
|---|---|---|---|---|
| 5,555,191 A | * | 9/1996 | Hripcsak | .................... 340/501 |
| 5,768,632 A | * | 6/1998 | Husted et al. | ................. 700/31 |
| 5,790,780 A | * | 8/1998 | Brichta et al. | ................. 714/40 |
| 6,173,128 B1 | * | 1/2001 | Saber et al. | ................. 399/109 |
| 6,188,973 B1 | * | 2/2001 | Martinez et al. | ............. 340/3.1 |

FOREIGN PATENT DOCUMENTS

| | | |
|---|---|---|
| JP | 07049802 | 2/1995 |
| JP | 07219806 | 8/1995 |

* cited by examiner

*Primary Examiner*—Patrick Assouad
(74) *Attorney, Agent, or Firm*—Staas & Halsey LLP

(57) ABSTRACT

A data processing system which provides increased reliability by properly managing a plurality of basic modules. System configuration data is a collection of information regarding basic modules constituting each target system. Compatibility data is compiled to keep statistics of past failures occurred in a target system, which maintains the following associated records: properties of failed basic modules, properties of their related modules, failure types, and failure counts. When a basic module is changed in a target system, the target system sends out a notification message. This message is received by a notification message parser and supplied to a system configuration manager via a hardware change manager. The system configuration manager first consults the system configuration data to identify the changed basic module and its related basic modules, and then retrieves information about compatibility of such basic modules by consulting the compatibility data. It evaluates the retrieved information and outputs advisory messages on a monitor screen.

11 Claims, 21 Drawing Sheets

| MODULE NAME | RELATED MODULE |
|---|---|
| MODULE A | MODULE B |
| MODULE A | MODULE C |
| MODULE A | MODULE D |
| MODULE B | MODULE A |
| MODULE C | MODULE A |
| MODULE D | MODULE A |

FIG.4

| MODULE NAME | VENDOR NAME | VERSION NUMBER | FAILURE COUNT |
|---|---|---|---|
| MODULE A | AAAA | 003 | 1 |
| MODULE B | BBBB | 001 | 2 |
| MODULE C | CCCC | 002 | 1 |
| MODULE D | DDDD | 010 | 3 |

FIG.5

| | |
|---|---|
| FAILURE TYPE | AABB ERROR |
| MODULE NAME | MODULE B |
| VENDOR NAME | BBBB |
| MODULE VERSION | 001 |
| RELATED MODULE | MODULE A |
| RELATED MODULE VENDOR | AAAA |
| RELATED MODULE VERSION | 003 |

FIG.7

| MODULE NAME | VENDOR NAME | VERSION NUMBER | RELATED MODULE | RELATED MODULE VENDOR | RELATED MODULE VERSION | FAILURE TYPE | FAILURE COUNT |
|---|---|---|---|---|---|---|---|
| MODULE A | BBBB | 001 | MODULE C | DDDD | 001 | AABB ERROR | 10 |
| MODULE B | AAAA | 001 | MODULE C | CCCC | 001 | BBAA ERROR | 2 |
| MODULE B | BBBB | 001 | MODULE A | AAAA | 003 | AABB ERROR | 1 |
| ... | ... | ... | ... | ... | ... | ... | ... |

FIG.8

| MODULE NAME | VENDOR NAME | VERSION NUMBER | RELATED MODULE | RELATED MODULE VENDOR | RELATED MODULE VERSION | FAILURE TYPE | FAILURE COUNT |
|---|---|---|---|---|---|---|---|
| MODULE A | AAAA | 001 | MODULE C | AAAA | 020 | AABB ERROR | 10 |
| MODULE A | BBBB | 001 | MODULE C | DDDD | 001 | BBAA ERROR | 2 |
| MODULE B | DDDD | 001 | MODULE A | BBBB | 011 | AABB ERROR | 5 |
| MODULE B | BBBB | 001 | MODULE D | CCCC | 003 | AABB ERROR | 3 |
| MODULE B | DDDD | 001 | MODULE A | AACC | 011 | AABB ERROR | 2 |
| MODULE B | DDDD | 001 | MODULE C | BBAA | 011 | AABB ERROR | 10 |
| MODULE C | BBAA | 001 | MODULE A | DDAA | 002 | AABB ERROR | 4 |
| . . . | | | | | | | |

FIG.11

MODULE NAME: MODULE B
VENDOR NAME: DDDD
MODULE VERSION: 001

FIG.12

| RELATED MODULE NAME | RELATED MODULE VENDOR | RELATED MODULE VERSION | FAILURE COUNT |
|---|---|---|---|
| MODULE A | BBBB | 011 | 5 |
| MODULE A | AACC | 011 | 2 |
| MODULE C | BBAA | 011 | 10 |
| ⋮ | ⋮ | ⋮ | ⋮ |

FIG.13

ALARM: MODULE B
FAILED IN SYSTEM 30-1

RECOMMENDED ALTERNATIVE IS:

VENDOR: AACC
VERSION: 011

FIG.14

| MODULE NAME | VENDOR NAME | VERSION NUMBER | RELATED MODULE | RELATED MODULE VENDOR | RELATED MODULE VERSION | FAILURE TYPE | FAILURE COUNT |
|---|---|---|---|---|---|---|---|
| MODULE A | AAAA | 001 | MODULE C | AAAA | 020 | AABB ERROR | 10 |
| MODULE A | BBBB | 001 | MODULE C | DDDD | 001 | BBAA ERROR | 2 |
| MODULE B | BBBB | 001 | MODULE A | BBBB | 011 | AABB ERROR | 5 |
| MODULE B | BBBB | 001 | MODULE D | CCCC | 003 | AABB ERROR | 3 |
| MODULE B | AACC | 001 | MODULE A | BBBB | 011 | AABB ERROR | 2 |
| MODULE B | DDDD | 001 | MODULE C | BBAA | 011 | AABB ERROR | 10 |
| MODULE C | BBAA | 001 | MODULE A | DDAA | 002 | AABB ERROR | 4 |
| ... | ... | ... | ... | ... | ... | ... | ... |

FIG.16

| VENDOR NAME | VERSION NUMBER | FAILURE COUNT |
|---|---|---|
| BBBB | 011 | 5 |
| AACC | 011 | 2 |
| ⋮ | ⋮ | ⋮ |

FIG.17

WARNING:
MODULE B HAS BEEN
REPLACED IN SYSTEM 30-1

BECAUSE OF ITS POOR COMPATIBILITY
WITH OTHER MODULES, THE ABOVE
MODULE SHOULD BE REPLACED WITH
THE FOLLOWING MODULE TO MINIMIZE
THE RISK OF TROUBLES.

VENDOR: AACC
        VERSION: 011

FIG.18

WARNING:
INAPPROPRIATE MODULE B
USED IN SYSTEM 30-1
BECAUSE OF ITS POOR COMPATIBILITY
WITH OTHER MODULES, THE ABOVE
MODULE SHOULD BE REPLACED WITH
THE FOLLOWING MODULE TO MINIMIZE
THE RISK OF TROUBLES.

VENDOR: AACC
  VERSION: 011

FIG.20

DATA PROCESSING SYSTEM WITH CONFIGURATION MANAGEMENT CAPABILITY BASED ON COMPATIBILITIES AMONG HARDWARE MODULES

BACKGROUND OF THE INVENTION

1. Field of the Invention

The present invention relates to a data processing system, and more particularly, to a data processing system which is constituted by a plurality of basic modules.

2. Description of the Related Art

Communications network systems involve a number of functional units such as signal transmission devices and switching subsystems. Those network elements are electronic systems which are generally composed of a plurality of circuit boards, or basic modules, each providing a specific function. Such a modular design allows maintenance people to repair the system easily when a failure occurs and some function is lost. This is actually accomplished by replacing a particular module that is relevant to the lost function. Although such replacement tasks seem simple, it is still possible for maintenance people to install a wrong module in place of the failed module, because they have to maintain and manage a large number of basic modules which constitute today's complex electronic systems.

To avoid the above problem, researchers have proposed several management methods. One example of such proposals is Japanese Patent Laid-open Publication No. 7-219806 (1995), which discloses a method to avoid mounting of an inappropriate module by mistake. This is achieved by comparing two instances of property data of basic modules. More specifically, one set of property data is maintained in the management system, based on the modules mounting locations. This is compared with the other set of property data that is stored in each basic module's identification data memory, thereby detecting erroneous installation of basic modules.

FIG. 21 is a diagram which shows a typical system configuration where the above-mentioned prior art method is employed. In this system of FIG. 21, the management system 1 monitors and controls each target system 30-1 to 30-n through a network 20. The network 20, which is configured as a data communication network (DCN) or the like, permits the management system 1 and target systems 30-1 to 30-n to communicate with each other. The target systems 30-1 to 30-n serve as network elements (e.g., transmission units, switches), each comprising a plurality of basic modules. Although not explicitly shown in FIG. 21, each basic module has a unique identifier in its storage portion to distinguish itself from others. When required, this information is supplied to the management system 1.

This management system 1 comprises a notification message parser 1a, a hardware change manager 1b, a failure record manager 1c, a system configuration database 1e, and a monitor console 1g. The notification message parser 1a receives various messages from the target systems 30-1 to 30-n and delivers them to relevant portions of the system 1, parsing the content of each message. The hardware change manager 1b becomes active when a basic module is replaced in any of the target systems 30-1 to 30-n. It retrieves information about the replaced module from the system configuration database 1e and displays it on a screen of the monitor console 1g. The failure record manager 1c, on the other hand, becomes active when a module failure has occurred in any of the target systems 30-1 to 30-n. It then retrieves information about the failed module, consulting the system configuration database 1e, and displays it on the monitor console 1g. The system configuration database 1e stores information on the mounting locations of basic modules constituting each target system, together with their identification data and the like. The monitor console 1g, which may be, for example, a cathode ray tube (CRT) display, visually presents information supplied from the hardware change manager 1b and failure record manager 1c.

The above-described conventional system operates as follows. Now suppose that the target system 30-1 has encountered a problem with a certain basic module. The target system 30-1 detects this failure and notifies the management system 1 of the failure event and the properties of the failed basic module, along with the information for identifying the target system 30-1 itself. What are referred to here as the "failures" include recoverable failures and non-recoverable (or fatal) failures. In the management system 1, the notification message parser 1a receives and parses the notification message from the target system 30-1, recognizing that the received message is a failure notification concerning a specific basic module. Thus the message is passed to the failure record manager 1c. With reference to the basic module's properties extracted from the message, the failure record manager 1c searches the system configuration database 1e to find information relevant to the failed module. This search yields more information related to the basic module, and the failure record manager 1c then displays it on the screen of the monitor console 1g, together with the information showing which target system holds the failed basic module.

In the way described above, the management system 1 permits the system administrator to readily find the target system and basic module in question. Further, since the screen presents the device name, vendor name, version number, and other information for identifying the failed basic module, the administrator can quickly understand which basic module should be replaced if the failure is unrecoverable.

The target system 30-1 to 30-n are designed to operate as follows, when a basic module is replaced. Suppose, for example, that a certain basic module in the target system 30-1 has been replaced with a new one as a result of deterioration or other causes of failure. The target system 30-1 then notifies the management system 1 of that module replacement. Also, the target system 30-1 sends property data read out of the new basic module, together with information for identifying the target system itself. This message is received and parsed by the notification message parser 1a in the management system 1. Finding that the message is intended for notification of replacement of a specific basic module, the notification message parser 1a supplies the information to the hardware change manager 1b. Based on the given information, the hardware change manager 1b searches the system configuration database 1e for data relating to the previously mounted basic module. The hardware change manager 1b also compares the new module with the previous one in terms of their module types (e.g., module name, vendor name, version number). If they do not agree with each other (or if the new module is not listed as a possible alternative to the previous module), the hardware change manager 1b displays an alarm message on the screen of the monitor 1g to alert that an inappropriate module is currently used in the target system 30-1. This allows the system administrator to readily determine whether the recent module replacement was properly performed or not.

The above-described conventional method, however, provides only a limited capability of module management. While the conventional method provides maintenance information about individual basic modules (e.g., which modules can be used for replacement), this may not always sufficient because the compatibility issues between one module and its related modules are lacking. Particularly, one could encounter a module incompatibility problem when trying to replace some module with another module from a different manufacturer or of a different version. That is, some replacement modules may not work together with other existing modules, because of the potential incompatibility between different vendor products or different product versions.

SUMMARY OF THE INVENTION

Taking the above into consideration, an object of the present invention is to provide a data processing system which checks the compatibility among basic modules used, so as to avoid any problems that could be caused by installation of inappropriate modules.

Another object of the present invention is to offer a data processing system which provides increased reliability of the entire system by continuously observing whether the system is properly configured with correct basic modules, and by pointing out a problem when a poorly compatible module is found.

To accomplish the above objects, according to the present invention, there is provided a data processing system that controls a plurality of basic modules as its constituent elements. This system comprises the following functional units: a failure detection unit which detects a failure of one of the basic modules; a data collection unit which collects property data of the failed basic module in response to the failure detected by the failure detection unit; a storage unit which stores the property data collected by the data collection unit, in association with an identifier that is to be used to identify the failed basic module; a processing unit which applies a predetermined process to what is stored in the storage unit; and an indication unit which shows the outcomes of the processing unit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram which presents an example of a connection table stored in a system configuration database shown in FIG. 2;

FIG. 5 is a diagram which shows an example of a hardware configuration data table stored in the system configuration database shown in FIG. 2;

FIG. 7 is a diagram which shows what data items are identified through the process of FIG. 6;

FIG. 8 is a diagram which shows an example of the compatibility data generated through the process of FIG. 6;

FIG. 11 is a diagram which shows an example of the compatibility data stored in the compatibility database shown in FIG. 2;

FIG. 12 is a diagram which shows an example of search key information used in the process of FIG. 9;

FIG. 13 is a diagram which shows an example of data retrieved by using the search key information of FIG. 12;

FIG. 14 is a diagram showing a typical screen shot which appears on the monitor screen as a result of the process shown in FIGS. 9 and 10;

FIG. 16 is a diagram which shows an example of the compatibility data stored in the compatibility database shown in FIG. 2;

FIG. 17 is a diagram showing an example of records of candidates for the most suitable module, which are found in the process of FIG. 15;

FIG. 18 is a diagram showing a typical screen shot which appears on the monitor screen as a result of the process of FIG. 15;

FIG. 20 is a diagram showing a typical screen shot which appears on the monitor screen as a result of the process of FIG. 19.

DESCRIPTION OF THE PREFERRED EMBODIMENTS

Preferred embodiments of the present invention will be described below with reference to the accompanying drawings.

Figure 1:
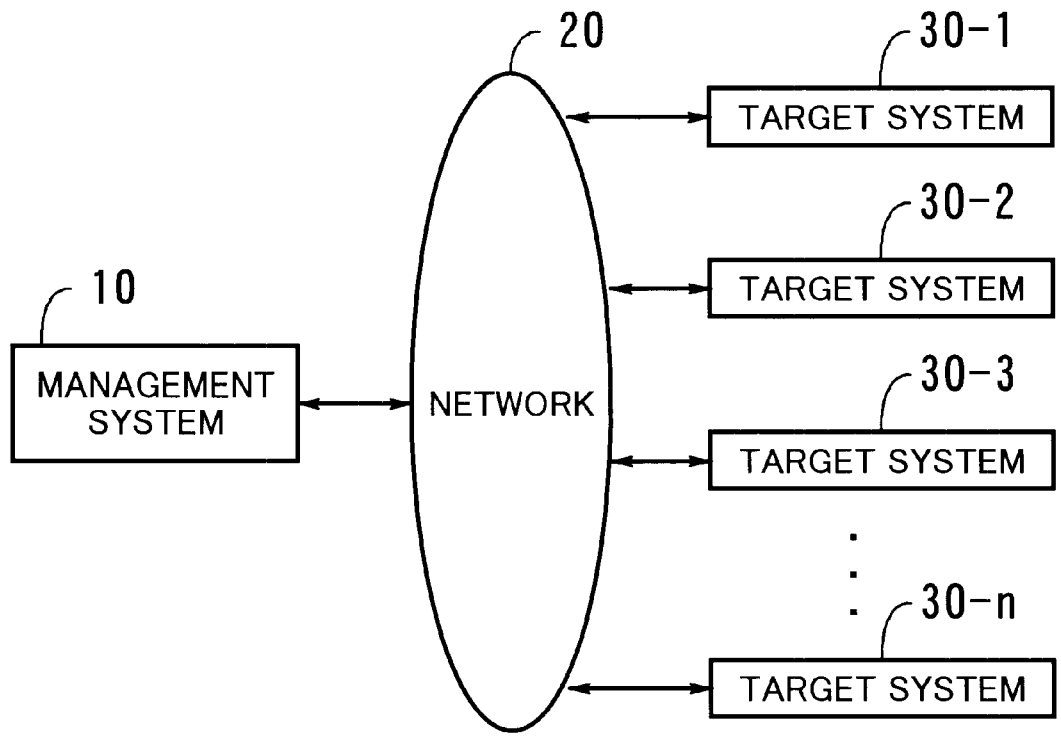
FIG. 1 is a diagram which shows an embodiment of the present invention.

FIG. 1 shows an embodiment of the present invention. In this embodiment, a management system 10 monitors and controls each target system 30-1 to 30-n through a network 20. The network 20, which is configured as a data communication network or the like, permits the management system 10 and target systems 30-1 to 30-n to exchange information. The target systems 30-1 to 30-n serve as network elements (e.g., transmission units, switches), each comprising a plurality of basic modules. Their detailed configuration will be discussed later.

Figure 2:
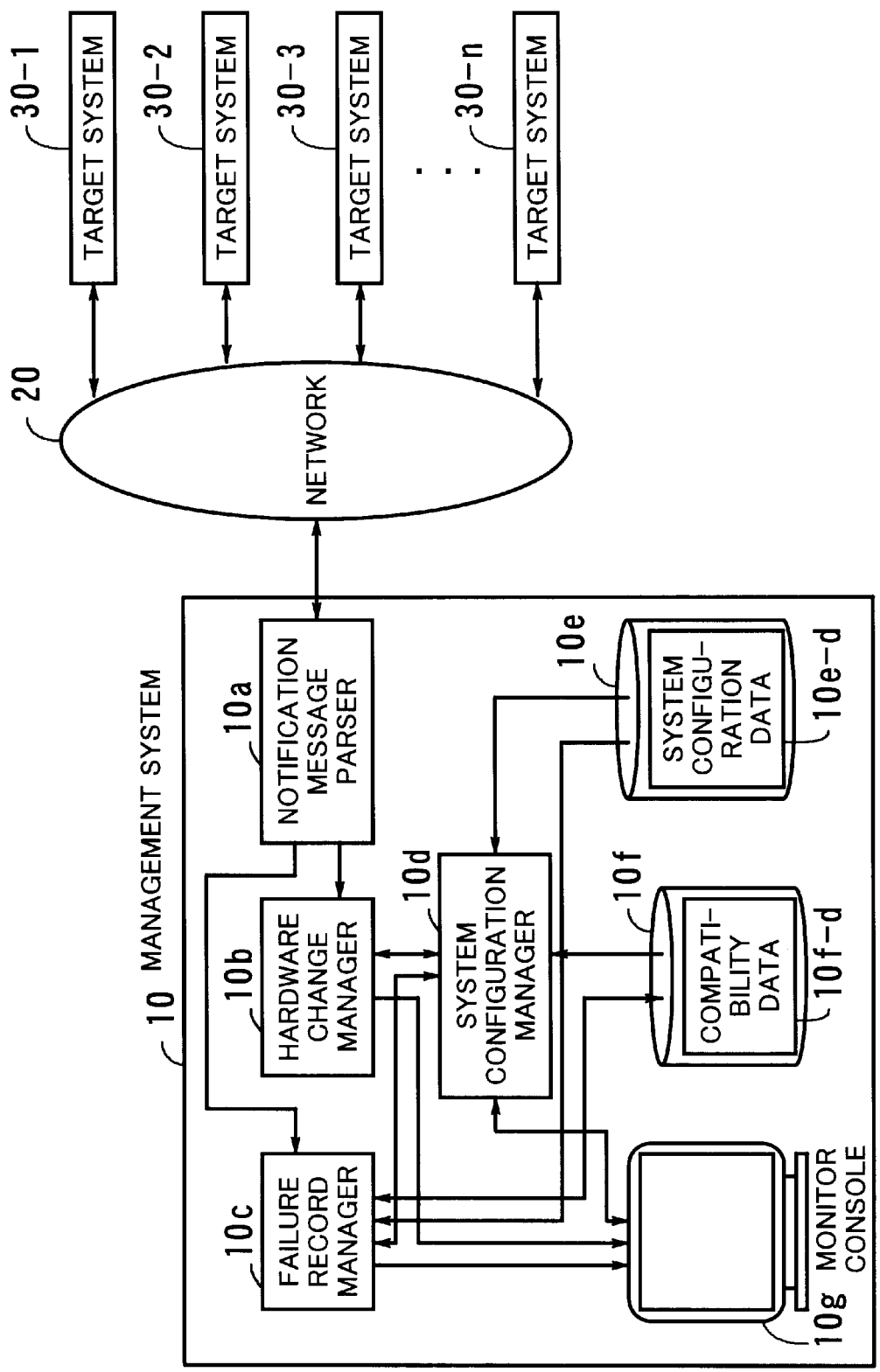
FIG. 2 is a block diagram which provides the details of a management system shown in FIG. 1.

FIG. 2 is a detailed block diagram of the management system 10 shown in FIG. 1. As seen from FIG. 2, the management system 10 comprises: a notification message parser 10a, a hardware change manager 10b, a failure record manager 10c, a system configuration manager 10d, a system configuration database 10e, a compatibility database 10f, and a monitor console 10g.

The notification message parser 10a receives various messages from the target systems 30-1 to 30-n and delivers them to relevant portions of the management system 10, parsing the content of each message.

The hardware change manager 10b is activated when a hardware module is replaced in any of the target systems 30-1 to 30-n. When activated, the hardware change manager 10b requests the system configuration manager 10d to examine to what extent the new module is compatible with its "related modules," and then causes the monitor console 10g to display the resultant information. Here, the term "related modules" refers to other modules having a certain relationship with a specific module of interest. For example, such modules that are physically coupled with a specific module of interest are called its "related modules."

The failure record manager 10c collects information on module failures when any errors are reported. It compiles the collected information as compatibility data and stores it in the compatibility database 10f. If a module failure occurs (or when the system administrator requests it), the failure record manager 10c directs the system configuration manager 10d to search for a specific module that is most suitable as an alternative to the failed module (or module specified by the administrator). When such a "most suitable module" is found, the failure record manager 10c then sends the information to the monitor console 10g to display the search result.

The system configuration manager 10d is activated by the failure record manager 10c or other subsystems. It searches the system configuration database 10e and compatibility database 10f to identify the most suitable module and returns the search result to the requester. The system configuration database 10e stores property data which describes hardware modules constituting each target system. It also stores system configuration data 10e–d which describes how the modules are interconnected. The compatibility database 10f, on the other hand, stores compatibility data 10f–d, which includes: information for identifying a failed module and its related modules, property data of those modules, and statistical data about their failures. The failure data indicates what types of module failures the target systems have experienced so far, as well as how many times each type of failure has occurred.

The monitor console 10g is a computer console having a CRT monitor, for instance, as a display device. It shows information supplied from the hardware change manager 10b, the failure record manager 10c, or the system configuration manager 10d.

Figure 3:
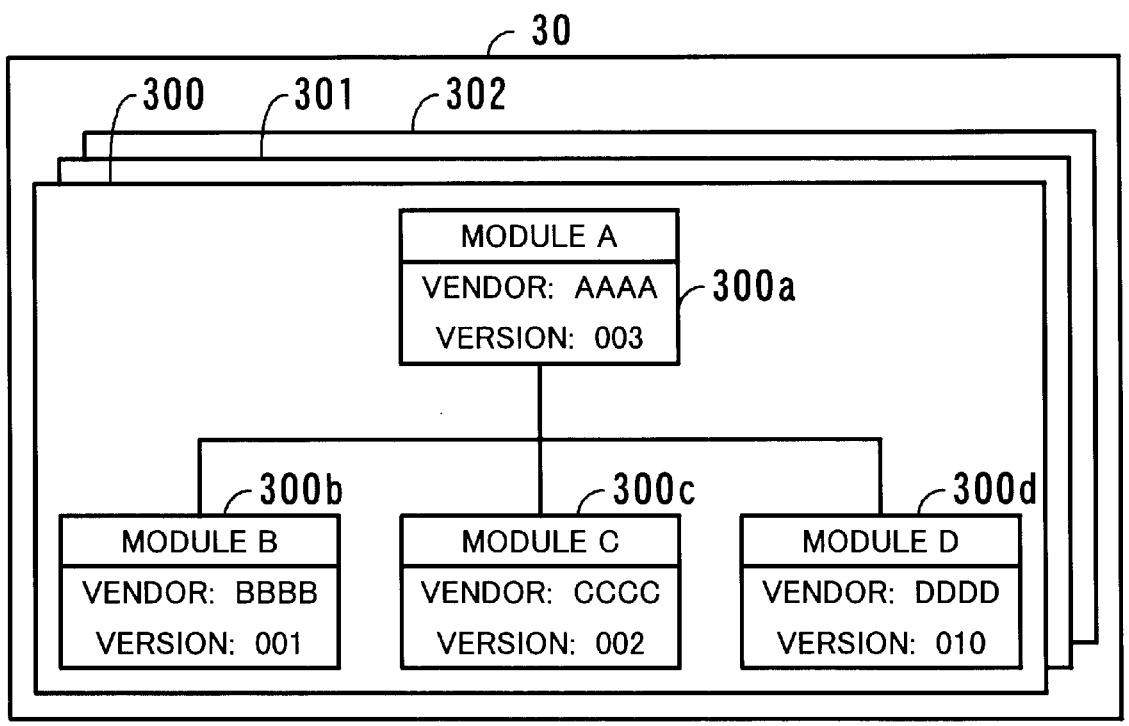
FIG. 3 is a block diagram which provides the details of a target system shown in FIG. 1.

FIG. 3 provides the details of a target system 30 which represents a typical configuration of the target systems 30-1 to 30-n shown in FIG. 1. As seen from FIG. 3, the target system 30 comprises a plurality of subsystem devices 300 to 302 each composed of a plurality of hardware modules (or simply "modules"). The device 300, for example, has four modules A to D as indicated by the reference numerals 300a to 300d, respectively. Each module 300a to 300d has a read-only memory (ROM) or other devices to store its own property data including its vendor name and version number.

FIGS. 4 and 5 present examples of data stored in the system configuration database 10e shown in FIG. 2. First, FIG. 4 shows a connection table which describes how each module is linked with other modules in a specific target device. Such a table is created separately for individual target devices to indicate the relationships among the hardware modules constituting each device. The first to third entries of the table of FIG. 4 show that the hardware module A relates to other modules B, C, and D, meaning that the module A is connected to the modules B, C, and D as shown in FIG. 3.

FIG. 5 shows a typical hardware configuration data table which contains property data of modules installed in each target device. This kind of table is created separately for each individual target device to summarize the management information about hardware modules constituting each device. The first entries of this table, for example, provides information about the hardware module A. More specifically, its vendor name is "AAAA," its version number is "003," and its failure count is currently "1."

Figure 6:
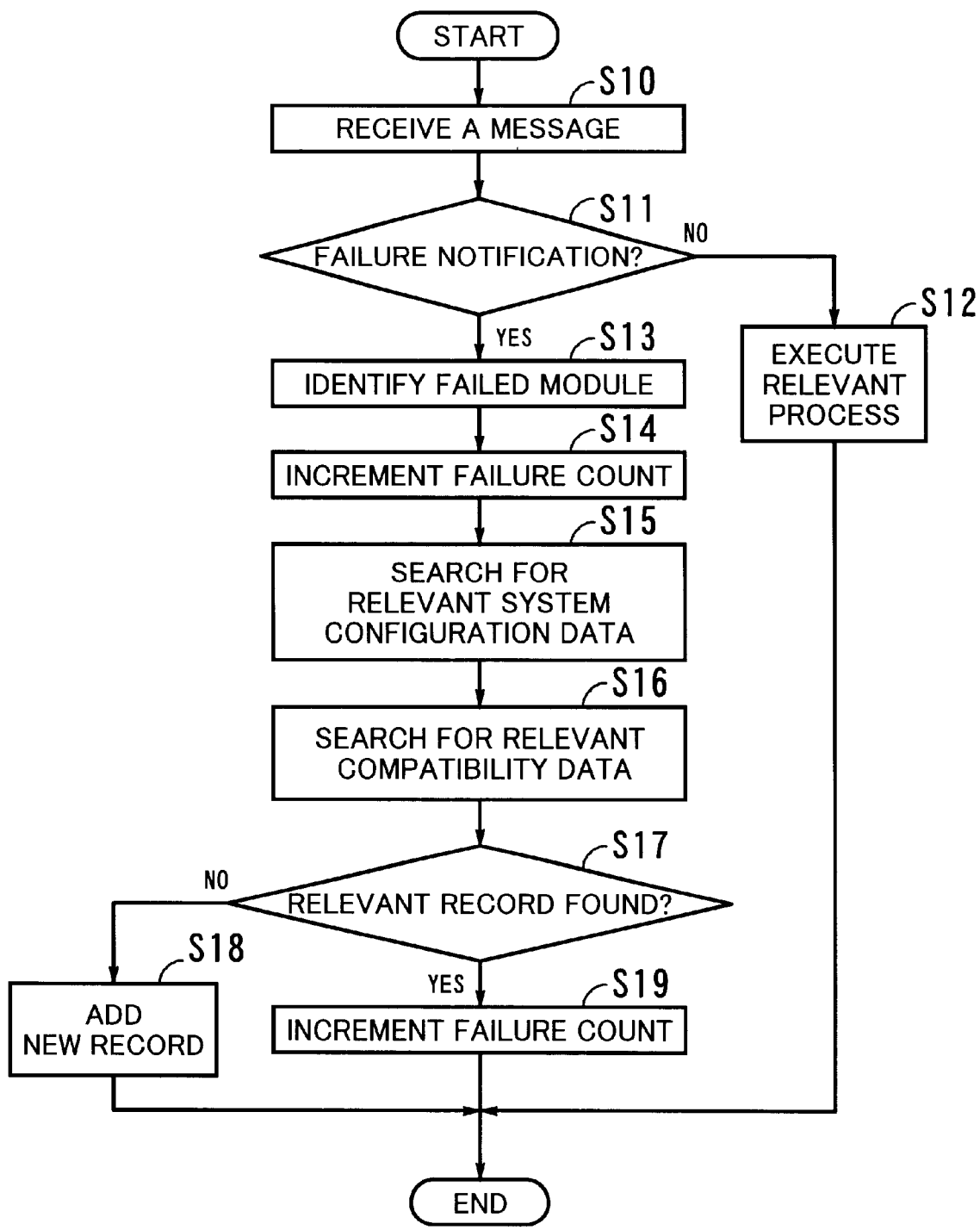
FIG. 6 is a flowchart which explains how compatibility data is compiled and stored in the compatibility database shown in FIG. 2.

According to the embodiment of the present invention, the proposed management system operates as follows. First of all, the following section will describe how the compatibility data 10f–d is compiled and stored in the compatibility database 10f. FIG. 6 is a flowchart which explains a typical process to create the compatibility data 10f–d. This process, assuming a failure of a hardware module B installed in the target system 30-1, comprises the following steps.

(S10) The notification message parser 10a receives a message from one of the target systems 30-1 to 30-n. In the present example, it receives a message from the target system 30-1 which indicates a failure of a module B installed therein.

(S11) The notification message parser 10a determines whether the received message indicates any failure in the sending system. If so, the process advances to step S13. If not, the process proceeds to step S12. In the present example, it proceeds to step S13.

(S12) The management system 10 executes a process relevant to the received message.

(S13) The failure record manager 10c identifies the failed module by examining its property data extracted from the received message. In the current context, the module B in the target system 30-1 is identified as the failed module.

(S14) The failure record manager 10c increments the failure count by one, with respect to the failed module. That is, the failure record manager 10c adds one to the failure count of the module B which is recorded in the hardware configuration data table of FIG. 5.

(S15) The failure record manager 10c searches the system configuration database 10e for relevant configuration data. Since the module B is faulty in the present example, the failure record manager 10c retrieves the fourth entry of the connection table of FIG. 4, thus finding that the module A relates to the module B in question. It then consults the hardware configuration data table of FIG. 5 to obtain the vendor names and version numbers of those modules A and B.

The above database search yields various information regarding the failed module B. as FIG. 7 shows in table form. In this example, the table contains the following data items: (1) failure type "AABB error," (2) module name "module B," (3) vendor name "BBBB," (4) module version number "001," (5) related module's name "module A," (6) related module's vendor name "AAAA," and (7) related module's version number "003."

(S16) The failure record manager 10c searches the compatibility database 10f for a compatibility data record relevant to the failed module.

(S17) The failure record manager 10c advances its processing to step S19 if any relevant compatibility data is present. If not, it proceeds to step S18. It is assumed in the present example that no relevant data record exists in the compatibility database 10f. The process then advances to step S18.

(S18) The failure record manager 10c registers the data items shown in FIG. 7 to the compatibility database 10f as a new record.

FIG. 8 shows an example of compatibility data, the content of the compatibility database 10f. In this example, each data record contains information about a module being managed, which includes: module name, vendor name, version number, failure type, and failure count. Each entry further provides information about its related module, including: module name, vender name, and version number. Take the first record for example. This record describes a specific element named "module A," whose vendor name and version number are "BBBB" and "001," respectively. The first record also shows that the module A relates to another module named "module C," whose vendor name and version number are "DDDD" and "001," respectively. The record further indicates that the system has experienced "AABB error" of the module B ten times. The table of FIG. 8 also has a new record as its third entry, which has just been registered at step S18. This means that the third entry of the table contains the same information as that shown in FIG. 7.

(S19) Now that the relevant data record is found in the compatibility database 10f, the failure record manager 10c updates a relevant part of the compatibility data 10f–d by incrementing the failure count by one. If, for example, the failure described in FIG. 7 is the second instance (i.e., the system has experienced the same failure before), then the compatibility database 10f adds one to the failure count field of the third record of the compatibility data 10f–d shown in FIG. 8, thus increasing the count from one to two.

Through the above-described steps, the proposed management system 10 produces and enters a new record to the compatibility database 10f, when a failure event is reported by a target device, but no relevant record is found therein. If there exists a relevant record, the management system increments the failure count within the record. The above process yields failure records of the entire system, since it collects information from all the target systems 30-1 to 30-n.

Figure 9:
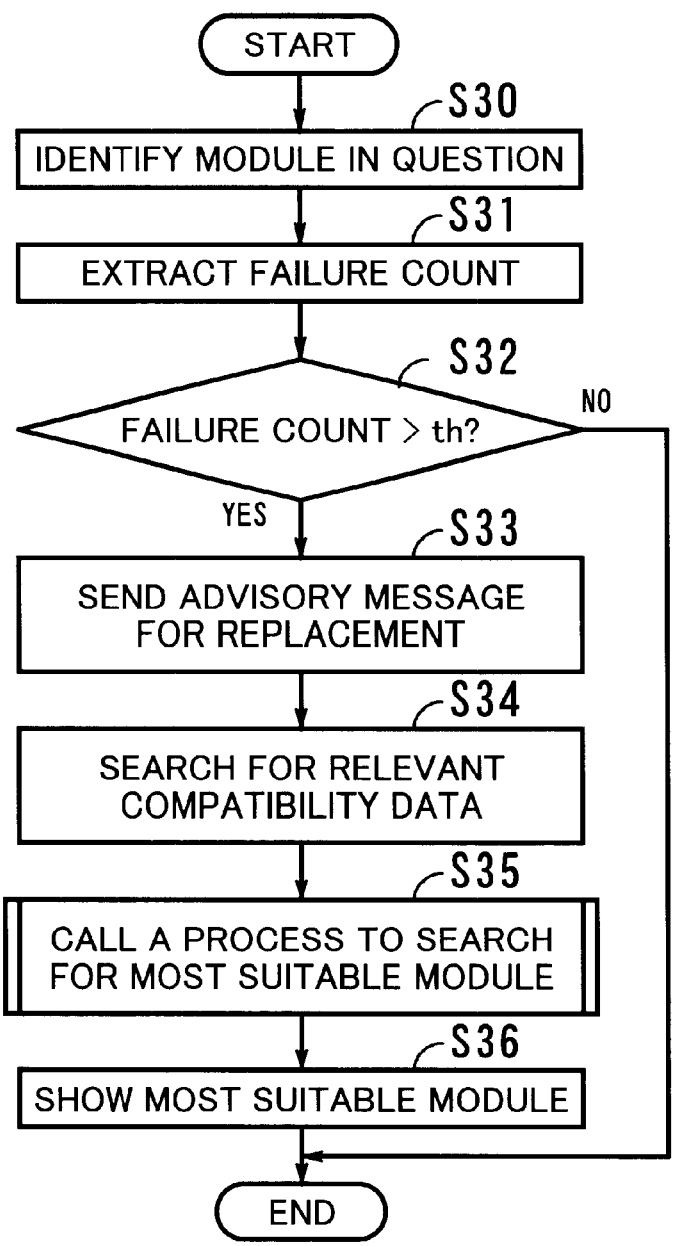
FIG. 9 is a flowchart showing an example of a failure handling process which determines whether each module in question is suitable for replacement.

When a certain event concerning hardware modules occurs (e.g., a module failure, or the administrator's request), the proposed management system will offer a practical suggestion regarding which module is most suitable for handling the event, consulting the compatibility data 10f–d stored therein. This process will now be described below in detail, with reference to the flowchart of FIG. 9. For illustrative purposes, it is assumed that the compatibility database 10f stores compatibility data shown in FIG. 11, and that the management system 10 has received a message telling that a certain module has just failed. The process shown in the flowchart comprises the following steps.

(S30) The failure record manager 10c identifies the module in question (i.e., the failed module in the present case), referring to the message received by the notification message parser 10a. Suppose, for instance, that the "module B" in the target system 30-1 is the failed module in question. The failure record manager 10c then identifies this module from the received message.

(S31) The failure record manager 10c retrieves the failure count of the failed module. That is, it searches the hardware configuration data table of FIG. 5 to find a record pertaining to the failed module B and then extracts its failure count from the record.

(S32) The failure record manager 10c determines whether the failure count extracted at step S31 is greater than a predetermined threshold th. If it exceeds th, the process advances to step S33. If not, the failure record manager 10c exits from the process.

(S33) The failure record manager 10c directs the monitor console 10g to display an advisory message recommending that the failed module be replaced.

(S34) The failure record manager 10c searches the compatibility data 10f–d for a record relevant to the module. That is, using the module name, vender name, and version number of the failed module as search keywords, the failure record manager 10c scans the compatibility data 10f–d to find any records relevant to the module.

In the present example, the data items shown in FIG. 12 serve as the search keywords. They are "module B," "CCCC," and "001," and therefore, the third, fifth, and sixth entries of the compatibility data of FIG. 11 will be retrieved as the information relevant to the failed module. FIG. 13 shows the search result in table form, whose first three data entries give the third, fifth, and sixth entries of the compatibility data of FIG. 11.

(S35) The failure record manager 10c searches for a module that is most suitable as an alternative to the failed module B. The details of this process will be described separately with reference to FIG. 10.

(S36) Now that the most suitable module is found at step S35, the failure record manager 10c shows it on a screen of the monitor console 10g. FIG. 14 is an example screen shot which appears on the monitor console 10g as a result of steps S34 and S36. This screen provides messages telling the system administrator that the module B in the target system 30-1 has failed and it should be replaced with a new one. The latter message specifically suggests that the module B with version "011" from a vendor "AACC" is the most suitable module for replacement.

Figure 10:
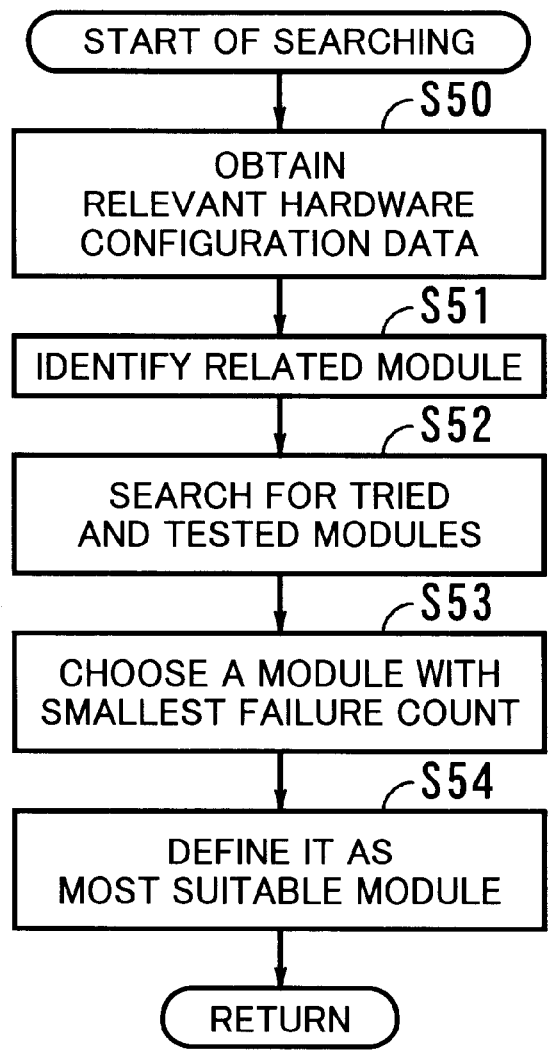
FIG. 10 is a flowchart which provides the details of how to find the most suitable module at step S35 in the flowchart of FIG. 9.

Referring now to FIG. 10, the detailed process to search for the most suitable module (step S35 in FIG. 9) will be described below. When called, this process executes the following steps.

(S50) The system configuration manager 10d obtains hardware configuration data pertaining to the failed module. In the present example, the module B in the target system 30-1 is the module of interest.

(S51) Searching the system configuration database 10e, the system configuration manager 10d identifies which modules are related to the failed module. In the present example, the module A is identified as being related to the failed module B.

(S52) The system configuration manager 10d searches the compatibility database 10f for a set of related modules that are well tried and tested in combination with the related module. In the present example, the module A installed in the target system 30-1 is of a version "003" and manufactured by the vendor "AAAA." Given such information on the module A, the system configuration manager 10d searches the compatibility database 10f to yield records that describe the module B in connection with its related module A.

(S53) Out of those obtained at step S53, the system configuration manager 10d finds one record that exhibits the smallest failure count value. Note here that the failure count contained in a record describing the combination of module B and its related module A indicates how many times the system has experienced the module B failures. There would be a case, however, that the module A may fail in connection with its related module B, since the association between two modules are bidirectional (see FIG. 4). To cover both cases, the system configuration manager 10d may be configured to retrieve such combinations of records and then asses the average failure count of each combination. This method yields the most suitable module, not only evaluating the failure count of the failed module B itself, but also considering that of its related module A.

(S54) The system configuration manager 10d returns to the calling process, with its result parameter, i.e., "module B" as the most suitable module.

The above-described process makes it possible for the administrator to choose an appropriate module that is most reliable in terms of failure rates, based on the compatibility data which contains past failure records of hardware modules. Particularly, as explained in FIGS. 9 and 10, the proposed system searches the compatibility data 10*f–d* to recommend the best alternative module when a specific type of hardware module shows frequent failures exceeding a predetermined threshold th. This permits the system administrator to promptly take corrective measures to solve hardware problems, thus increasing the reliability of the target systems.

Figure 15:
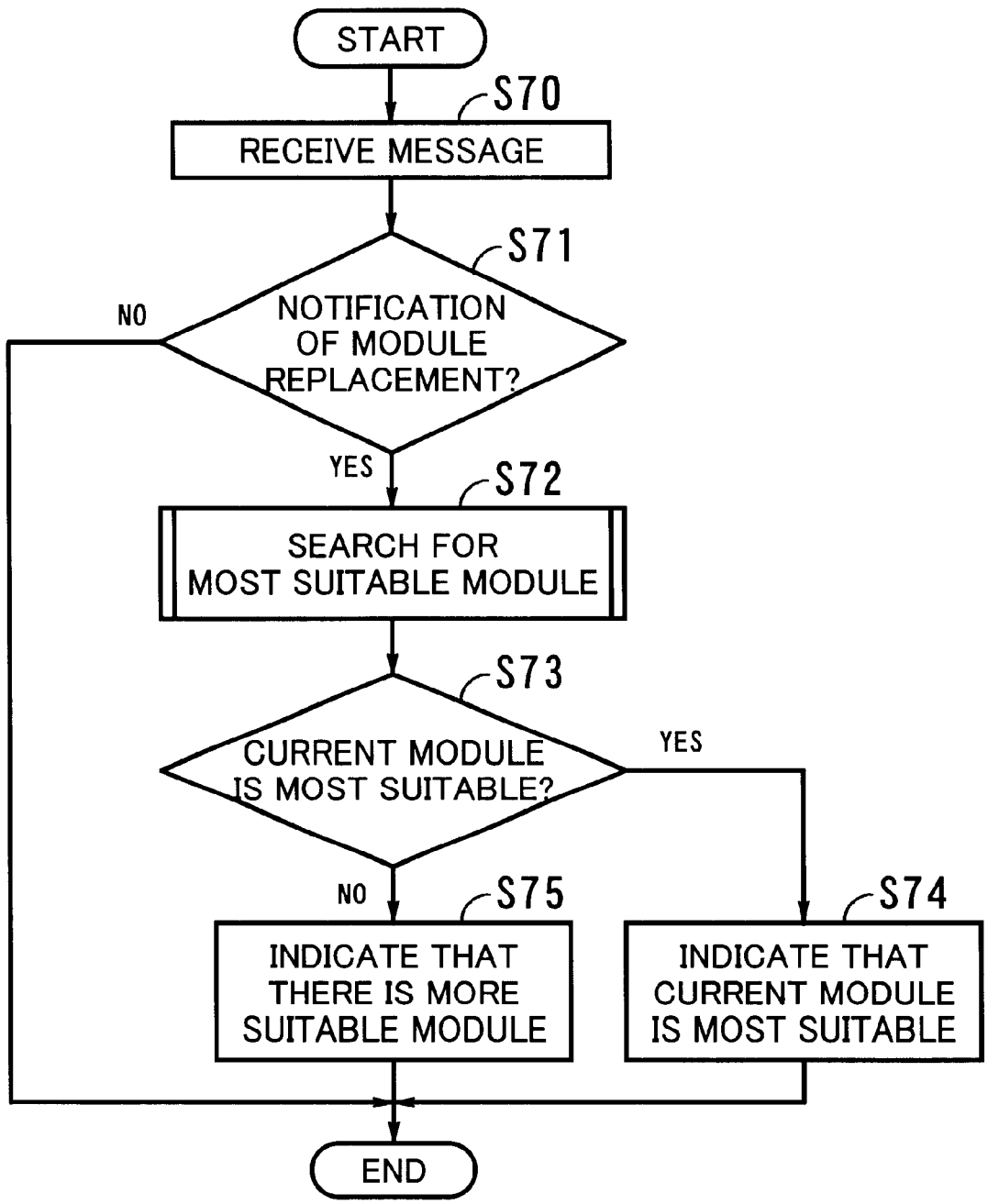
FIG. 15 is a flowchart showing an example process to be executed when a module is replaced in a target system.

In addition to offering an advisory message for module replacement, the proposed management system also provides a function to validate a new module when it is installed. Suppose that a certain module is replaced in any of the target systems 30-1 to 30-n. Then the system calls a process shown in a flowchart of FIG. 15. For illustrative purposes, the following assumes that the compatibility database 10*f* currently holds compatibility data shown in FIG. 16, and that the target system 30-1 has experienced replacement of its module B. The process of FIG. 15 comprises the following steps.

(S70) The notification message parser 10*a* receives a message transmitted from one of the target systems 30-1 to 30-n. This message carries information indicating that the failed module has been replaced with another module, together with the property data of that new module. It also contains information that allows the recipient to identify in which target system the replacement took place. In the present example, the notification message parser 10*a* receives such a message from the target system 30-1.

(S71) The notification message parser 10*a* determines whether the received message is a notification of module replacement. If so, the process advances to step S72. If not, the notification message parser 10*a* exits from the present process.

(S72) The notification message parser 10*a* then supplies the received message to the hardware change manager lob. The hardware change manager 10*b* then requests the system configuration manager 10*d* to search for the most suitable module. Details of this step S72 will not be explained here, because it has been described earlier in FIG. 10.

In the present example, the module B was replaced and the module A is known as its related module. The system configuration manager 10*d* therefore obtains records describing the module B and its related module A. FIG. 17 shows an example of data obtained through this step 72, which lists two instances of module B. The two modules have the same version number "011," but are supplied from different vendors, "BBBB" and "AACC." The system chooses the one from the vendor "AACC" as the most suitable module, since it exhibits a smaller failure count than the other's.

(S73) The hardware change manager 10*b* tests whether the replaced module (i.e., previous module) agrees with what has been found at step S72 as the most suitable module. If they agree with each other, the process advances to step S74. If not, the process proceeds to step S75.

(S74) The hardware change manager 10*b* directs the monitor console 10*g* to display a message indicating that the current module is the most suitable among others.

(S75) The hardware change manager 10*b* directs the monitor console 10*g* to display a message indicating that there is a more suitable module than the one currently installed.

FIG. 18 is an example screen shot which appears on the monitor console log as a result of step S75. This screen provides a message to the administrator which informs that the module B in the target system 30-1 has been replaced with a new module. The message then warns him/her that the new module B may have a problem in compatibility with other modules. It further recommends him/her to replace the current module with an alternative module B which has the same version number "011," but comes from a different vendor "AACC."

The above message permits the system administrator sitting at the management system 10 to check whether the module replacement was properly performed. If the management system 10 indicates that the current module is not appropriate, he/she can forward the information to another person who manages the remote target system, requesting that the module in question will be replaced again with a more suitable one.

Figure 19:
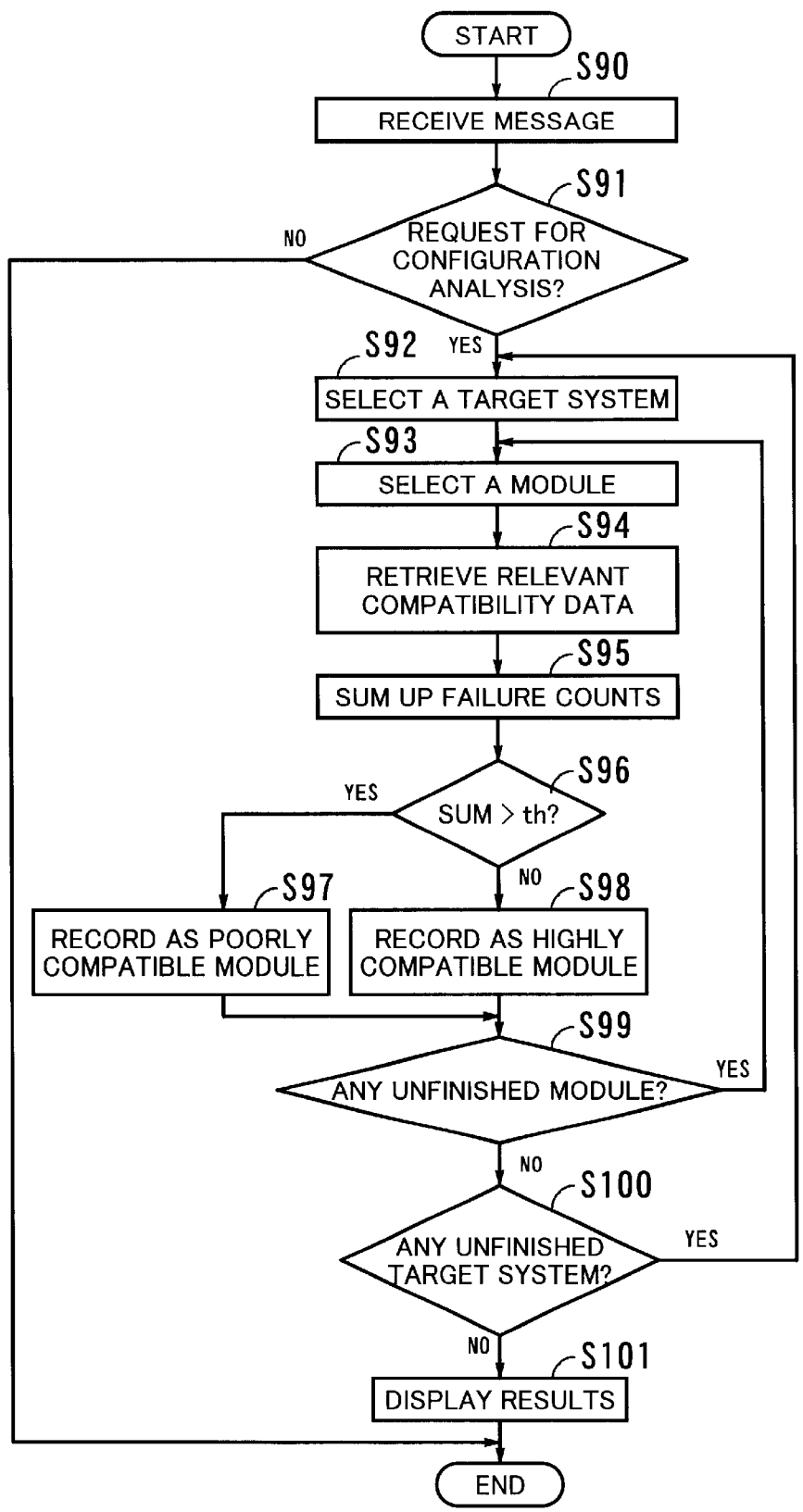
FIG. 19 is a flowchart which explains an example of a process to analyze what modules are currently installed.
Figure 21:
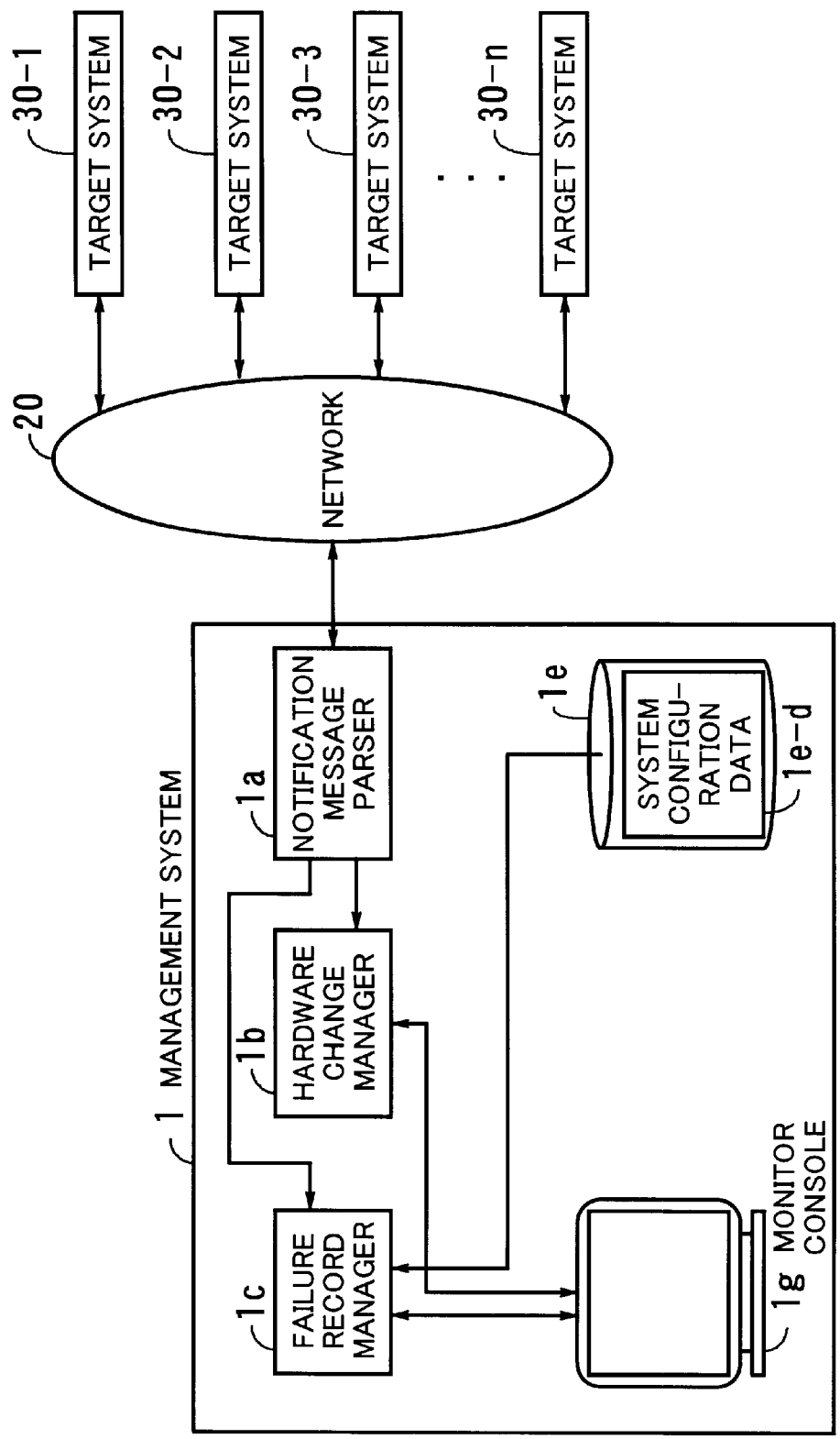
FIG. 21 is a block diagram which shows a typical configuration of a conventional management system.

Referring lastly to FIG. 19, the following section will explain a process to analyze the current configuration of the system. This analysis is initiated by a command that the system administrator may give through an input device (not shown) of the management system 10. The process comprises the following steps.

(S90) The system configuration manager 10*d* receives a message from the input device, a part of the monitor console log.

(S91) The system configuration manager 10*d* examines whether the given message is an information request for the current system configuration. If so, the process advances to step S92. If not, the system configuration manager 10*d* exits from the process.

(S92) Consulting the system configuration database 10*e*, the system configuration manager 10*d* selects one of target systems that will be analyzed. For illustrative purposes, it is assumed here that the target system 30-1 is selected.

(S93) Consulting again the system configuration database 10*e*, the system configuration manager 10*d* takes up a module from among those that constitute the target system selected at step S92. Suppose, for instance, that the system configuration manager 10*d* selects a module A for the subject of configuration analysis.

(S94) The system configuration manager 10*d* searches the compatibility database 10*f* for a record relevant to the module selected at step S93. More specifically, the system configuration manager 10*d* consults the system configuration database 10*e* to retrieve property data of the module A installed in the target system 30-1. It then makes access to the compatibility database 10*f* to find relevant records by using the retrieved property data as the key information.

(S95) The system configuration manager 10*d* calculates the sum of the failure counts extracted from the records obtained at step S94. Suppose, for example, that the step S94 has yielded three records. Then the system configuration manager 10*d* sums up the failure counts contained in those three records.

(S96) The system configuration manager 10*d* determines whether the sum is greater than a predetermined threshold th. If it is, the process advances to step S97. If not, the process proceeds to step S98.

(S97) The system configuration manager 10*d* records the module of interest, classifying it as a poorly compatible module. In the present example, the system configuration manager 10*d* will record the module A as a poorly compatible module if the sum exceeds the threshold th.

(S98) The system configuration manager 10*d* records the module of interest, classifying it as a highly compatible module. In the present example, the system configuration manager 10d will record the module A as a highly compatible module if the sum is not greater than the threshold th. (S99) The system configuration manager 10d determines whether there is an unfinished module in the target system being analyzed. It returns to step S93 when there are any modules awaiting the processing. If no such modules exist, it advances to step S100. In the present example, the process returns to step S93 if any unfinished modules exist in the target system 30-1, and otherwise, it goes to step S100.

(S100) The system configuration manager 10d determines whether any target system remains unfinished. If such an unfinished target system still exists, the process returns to step S92. If not, it proceeds to step S101. In other words, the process advances to step S101 when all the target systems 30-1 to 30-n have been evaluated. Otherwise, the process returns to step S92.

(S101) The system configuration manager 10d sends its outcomes to the monitor console 10g to display the result of the above steps.

FIG. 20 shows an example screen shot which appears on the monitor console log as a result of this step S101. The message on this screen points out the poor compatibility of the module B when it is used with other modules in the target system 30-1. The management system 10 recommends that the current module B should be replaced with an alternative module with a version number "011" sourced from a vendor "AACC."

In short, the above steps S90 to S101 verify the current system in terms of the selection and usage of suitable modules, based on the compatibility data. This makes it possible to find and replace inappropriate modules in a proactive manner, thus realizing a more reliable system.

While the above-described embodiment has assumed that the invention is applied to a communications system. The present invention, however, is not limited to this specific application. Rather, it is also applicable to any other systems as long as they have a modular structure.

Further, it is not intended to limit the present invention to the management of circuit boards or modules. It will be appreciated that the proposed system is also useful in managing the hardware configuration at the individual component level, for example.

The above discussion is summarized as follows. The present invention proposes an improved data processing system that controls a plurality of basic modules as its constituent elements. According to the present invention, the system comprises the following elements: a failure detection unit which detects a failure of one of the basic modules; a data collection unit which collects property data of the failed basic module in response to the failure detected by the failure detection unit; a storage unit which stores the property data collected by the data collection unit, in association with an identifier that is to be used to identify the failed basic module; a processing unit which applies a predetermined process to what is stored in the storage unit; and an indication unit which shows the outcomes of the processing unit. This structure permits the system to monitor the configuration of itself, in terms of correct usage of basic modules. The proposed techniques make it possible to build a more reliable system.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data processing system that controls a plurality of basic modules as constituent elements thereof, comprising:

failure detection means for detecting a failure of one of the basic modules;

data collection means for collecting property data of the failed basic module in response to the failure detected by said failure detections means, the property data providing information to identify a related basic module being coupled to the failed basic module;

storage means for storing the property data collected by said data collection means, in association with an identifier that is to be used to identify the failed basic module;

processing means for calculating a failure count of each type of basic module whose property data and identifier are stored in said storage means, identifying the related basic module coupled to the failed basic module, and searching said storage means to find such a basic module that exhibits a smallest failure count among those coupled to the related basic module that is identified; and indication means for indicating presence of the basic module that said processing means has found as a suitable module that has a best compatibility with the related basic module.

2. The data processing system according to claim 1, further comprising replacement detection means for detecting replacement of one of the basic modules, wherein:

when said replacement detection means has detected a new basic module introduced as a result of the replacement, said processing means determines whether the new basic module is most suitable in terms of compatibility with the related basic module thereof; and said indication means suggests the presence of an alternative basic module that has a better compatibility, if available.

3. An apparatus, comprising:

a data collection unit collecting and storing in a storage device property data of a failed basic module in response to a detected failure, the property data providing information identifying a related basic module being coupled to the failed basic module;

calculating a failure count of each type of basic module whose property data are stored in said storage unit, identifying the related basic module coupled to the failed basic module, and searching said storage device to identify a basic module possessing a smallest failure count among those coupled to the related basic module that is identified.

4. An apparatus as recited in claim 3, further comprising a replacement detection unit detecting when a new basic module is replaced, and upon replacement, said processing unit determines whether the new basic module is compatible with the respective related basic module.

5. An apparatus as recited in claim 4, wherein the replacement detection unit further determines an alternative basic module possessing a better compatibility than the new basic module, if available.

6. A method, comprising:

collecting and storing in a storage device property data of a failed basic module in response to a detected failure, the property data providing information identifying a related basic module being coupled to the failed basic module;

calculating a failure count of each type of basic module whose property data are stored in said storage unit, identifying the related basic module coupled to the failed basic module, and searching said storage device to identify a basic module possessing a smallest failure count among those coupled to the related basic module that is identified.

7. A method as recited in claim 6, further comprising:

detecting when a new basic module is replaced;

upon replacement, determining whether the new basic module is compatible with the respective related basic module.

8. A method as recited in claim 7, further comprising:

determining an alternative basic module possessing a better compatibility than the new basic module, if available.

9. A computer readable storage, controlling a computer by, collecting and storing in a storage device property data of a failed basic module in response to a detected failure, the property data providing information identifying a related basic module being coupled to the failed basic module;

calculating a failure count of each type of basic module whose property data are stored in said storage unit, identifying the related basic module coupled to the failed basic module, and searching said storage device to identify a basic module possessing a smallest failure count among those coupled to the related basic module that is identified.

10. A storage as recited in claim 9, further controlling a computer by, detecting when a new basic module is replaced;

upon replacement, determining whether the new basic module is compatible with the respective related basic module.

11. A storage as recited in claim 10, further controlling a computer by, determining an alternative basic module possessing a better compatibility than the new basic module, if available.

* * * * *